(12) United States Patent
Byun et al.

(10) Patent No.: US 7,836,934 B2
(45) Date of Patent: Nov. 23, 2010

(54) STRUCTURE FOR LOADING SUBSTRATE IN SUBSTRATE BONDING APPARATUS FOR FABRICATING LIQUID CRYSTAL DISPLAY DEVICE

(75) Inventors: Young Sang Byun, Kumi-shi (KR); Kyung Su Chae, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 621 days.

(21) Appl. No.: 11/984,689

(22) Filed: Nov. 20, 2007

(65) Prior Publication Data
US 2008/0099138 A1    May 1, 2008

Related U.S. Application Data

(62) Division of application No. 10/700,475, filed on Nov. 5, 2003, now Pat. No. 7,314,535.

(30) Foreign Application Priority Data
Nov. 7, 2002    (KR)    ...................... 10-2002-0068822

(51) Int. Cl.
*B32B 37/00* (2006.01)
(52) U.S. Cl. .................. 156/580; 156/381; 156/382
(58) Field of Classification Search .......... 156/580, 156/381, 382, 350
See application file for complete search history.

(56) References Cited

U.S. PATENT DOCUMENTS

| | | | |
|---|---|---|---|
| 3,498,663 A | 3/1970 | Cantrill | |
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,680,189 A | 10/1997 | Shiizu et al. | |

(Continued)

FOREIGN PATENT DOCUMENTS

EP    1 003 066 A1    5/2000

(Continued)

*Primary Examiner*—Jeff H Aftergut
(74) *Attorney, Agent, or Firm*—McKenna Long & Aldridge

(57) ABSTRACT

A substrate bonding apparatus for use in fabricating LCD devices substantially prevents substrates held to upper stages from sagging. The substrate bonding apparatus may, for example, include upper and lower stages having a plurality of passages for holding respective substrates; suction force applying means having one end mounted within each passage for transmitting a suction force to operably proximate portions of a substrate, wherein the one end of the suction force applying means is projectable from within each passage to a predetermined distance from the stage; and a vacuum pump for providing a suction force to the suction force applying means.

11 Claims, 5 Drawing Sheets

U.S. PATENT DOCUMENTS

| | | | |
|---|---|---|---|
| 5,742,370 A | 4/1998 | Kim | |
| 5,757,451 A | 5/1998 | Miyazaki | |
| 5,805,330 A * | 9/1998 | Byker et al. | 359/265 |
| 5,852,484 A | 12/1998 | Inoue et al. | |
| 5,854,664 A | 12/1998 | Inoue et al. | |
| 5,861,932 A | 1/1999 | Inata | |
| 5,875,922 A | 3/1999 | Chastine et al. | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 * | 10/2001 | Egami et al. | 349/189 |
| 6,337,730 B1 | 1/2002 | Ozaki | |
| 6,414,733 B1 | 7/2002 | Ishikawa | |
| 6,665,043 B1 | 12/2003 | Okuyama et al. | |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |

| | | | | | |
|---|---|---|---|---|---|
| JP | 2001-166272 | 6/2001 | JP | 2002-139734 | 5/2002 |
| JP | 2001-166310 | 6/2001 | JP | 2002-156518 | 5/2002 |
| JP | 2001-183683 | 7/2001 | JP | 2002-169166 | 6/2002 |
| JP | 2001-201750 | 7/2001 | JP | 2002-169167 | 6/2002 |
| JP | 2001-209052 | 8/2001 | JP | 2002-182222 | 6/2002 |
| JP | 2001-209056 | 8/2001 | JP | 2002-202512 | 7/2002 |
| JP | 2001-209057 | 8/2001 | JP | 2002-202514 | 7/2002 |
| JP | 2001-209058 | 8/2001 | JP | 2002-214626 | 7/2002 |
| JP | 2001-209060 | 8/2001 | JP | 2002-229042 | 8/2002 |
| JP | 2001-215459 | 8/2001 | JP | 2002-236276 | 8/2002 |
| JP | 2001-222017 | 8/2001 | JP | 2002-258299 | 8/2002 |
| JP | 2001-235758 | 8/2001 | JP | 2002-236292 | 9/2002 |
| JP | 2001-255542 | 9/2001 | JP | 2002-277865 | 9/2002 |
| JP | 2001-264782 | 9/2001 | JP | 2002-277866 | 9/2002 |
| JP | 2001-272640 | 10/2001 | JP | 2002-277881 | 9/2002 |
| JP | 2001-281675 | 10/2001 | JP | 2002-287156 | 10/2002 |
| JP | 2001-281678 | 10/2001 | JP | 2002-296605 | 10/2002 |
| JP | 2001-282126 | 10/2001 | JP | 2002-311438 | 10/2002 |
| JP | 2001-305563 | 10/2001 | JP | 2002-311440 | 10/2002 |
| JP | 2001-330837 | 11/2001 | JP | 2002-311442 | 10/2002 |
| JP | 2001-330840 | 11/2001 | JP | 2002-323687 | 11/2002 |
| JP | 2001-356353 | 12/2001 | JP | 2002-323694 | 11/2002 |
| JP | 2001-356354 | 12/2001 | JP | 2002-333628 | 11/2002 |
| JP | 2002-014360 | 1/2002 | JP | 2002-333635 | 11/2002 |
| JP | 2002-023176 | 1/2002 | JP | 2002-333843 | 11/2002 |
| JP | 2002-049045 | 2/2002 | JP | 2002-341329 | 11/2002 |
| JP | 2002-079160 | 3/2002 | JP | 2002-341355 | 11/2002 |
| JP | 2002-080321 | 3/2002 | JP | 2002-341356 | 11/2002 |
| JP | 2002-082340 | 3/2002 | JP | 2002-341357 | 11/2002 |
| JP | 2002-090759 | 3/2002 | JP | 2002-341358 | 11/2002 |
| JP | 2002-090760 | 3/2002 | JP | 2002-341359 | 11/2002 |
| JP | 2002-107740 | 4/2002 | JP | 2002-341362 | 11/2002 |
| JP | 2002-122870 | 4/2002 | KR | 2000-0035302 | 6/2000 |
| JP | 2002-122872 | 4/2002 | KR | 10-2001-0021475 | 3/2001 |
| JP | 2002-122873 | 4/2002 | | | |
| JP | 2002-131762 | 5/2002 | | | |

* cited by examiner

STRUCTURE FOR LOADING SUBSTRATE IN SUBSTRATE BONDING APPARATUS FOR FABRICATING LIQUID CRYSTAL DISPLAY DEVICE

This application is a divisional application of 10/700,475 filed Nov. 5, 2003, now U.S. Pat. No. 7,314,535, which claims the benefit of Korean Application No. P2002-68822 filed Nov. 7, 2002, which are incorporated by reference for all purposes as if fully set forth herein.

BACKGROUND OF THE INVENTION

1. Field of the Invention

The present invention relates to a substrate bonding apparatus for fabricating liquid crystal display (LCD) devices fabricated according to a liquid crystal dispensing method. More particularly, the present invention relates to a structure for securing substrates to stages (e.g., upper stages) of a substrate bonding apparatus.

2. Discussion of the Related Art

As the development of diverse types of information devices proliferate and become available to consumers, demands on the types of displays used by the information devices have increased. To meet such demands, many types of flat display devices including Liquid Crystal Display (LCD) devices, Plasma Display Panels (PDP), Electro Luminescent Display (ELD), Vacuum Fluorescent Display (VFD), etc., are currently being developed and, in some instances, actually employed as displays.

Among the various flat displays, LCD devices are commonly used as portable display devices. Due to their beneficial characteristics such as excellent picture quality (e.g., high resolution and luminance), light weight, thin profile, large display area, and low power consumption, LCD devices are commonly used in applications previously dominated by Cathode Ray Tubes (CRTs). Accordingly, LCD devices are commonly used in applications such as monitors of notebook computers, monitors of computers, and as TVs capable of receiving and displaying broadcasting signals.

Generally, LCD devices are fabricated using liquid crystal injection or liquid crystal dispensing methods. According to the liquid crystal injection method, opposing substrates are bonded together in a vacuum via a patterned sealant material formed on one of the substrates, wherein the patterned sealant material includes a liquid crystal injection hole. After being bonded, liquid crystal material is injected through the liquid crystal injection hole and between the bond substrates. Japanese Laid Open Patent Nos. 2000-284295 (Japanese Patent Application 1999-089612) and 2001-005405 (Japanese Patent Application 1999-172903) can be understood to teach a related art liquid crystal dispensing method wherein first and second substrates are provided and liquid crystal material is dispensed onto the first substrate. Subsequently, the first and second substrates are arranged to oppose each other, wherein the dispensed liquid crystal material is arranged between the opposing substrates. Lastly, the opposing substrates are bonded together in a vacuum.

FIG. 1 illustrates a related art substrate bonding apparatus for fabricating LCD devices using the liquid crystal dispensing method.

Referring to FIG. 1, a related art substrate bonding apparatus includes a frame 10, an upper stage 21, a lower stage 22, a sealant dispenser (not shown), a liquid crystal dispenser 30, an upper chamber unit 31, a lower chamber unit 32, chamber moving means, and stage moving means. The sealant dispenser and liquid crystal dispenser 30 are mounted at side positions of the frame 10. The upper chamber unit 31 can be selectively joined to the lower chamber unit 32. The chamber moving means includes a driving motor 40 for moving the lower chamber unit 32 to position S1, where sealant material and liquid crystal material can be dispensed onto a substrate, and to position S2, where substrates can be bonded together. The stage moving means includes a driving motor 50 for raising and lowering the upper stage 21 before, during, and after the substrates have been bonded. Having described the related art substrate bonding apparatus above, the process by which the related art substrate bonding apparatus fabricates an LCD device will now be described in greater detail below.

To fabricate an LCD device using the related art substrate bonding apparatus described above, a first substrate 51 is held by the upper stage 21 while a second substrate 52 is held by the lower stage 22, as shown in FIG. 1. Next, the chamber moving means moves the lower chamber unit 32, supporting the lower stage 22, to the position S1. Subsequently, sealant material and liquid crystal material are dispensed onto the second substrate 52 held by the lower stage 22. After sealant material and liquid crystal material are dispensed onto the second substrate 52, the chamber moving means moves the lower chamber unit 32 to position S2, as shown in FIG. 2, whereby the first and second substrates 51 and 52, respectively, can be bonded together. With the lower chamber unit 32 at position S2, the chamber moving means joins the upper chamber unit 31 to the lower chamber unit 32. Upon being joined, the upper chamber unit 31 and the lower chamber unit 32 define an interior space that encloses the upper and lower stages 21 and 22, respectively. Using a vacuum means (not shown), the interior space is evacuated to create a vacuum. Within the evacuated interior space, the stage moving means lowers the upper stage 21 such that the first substrate 51, held by the upper stage 21, moves toward the second substrate 52, held by the lower stage 22. As the upper stage 21 descends, the first and second substrates 51 and 52, respectively, become bonded to each other, thereby completing fabrication of the LCD device.

Fabricating LCD devices using the related art substrate bonding apparatus, however, is disadvantageous because the upper stage 21 holds the first substrate 51 by transmitting a suction force to operably proximate portions of the first substrate 51. Due to the dimensions and weight of the first substrate 51, some portions of the first substrate 51 may not be operably proximate the upper stage 21. For example, peripheral portions of the first substrate 51 may be sufficiently close to the upper stage 21 (i.e., operably proximate) to be affected by the transmitted suction force. However, due to the weight of the first substrate 51, interior portions of the first substrate 51 may be spaced apart from the upper stage 51 (e.g., sag) by a distance which is outside the range (i.e., not operably proximate) in which the transmitted suction force may affect the first substrate 51. Accordingly, the upper stage 21 may not effectively transmit a suction force to those portions of the first substrate 51 that are not operably proximate to the upper stage 21.

Related art attempts to prevent the aforementioned sagging phenomenon from occurring have been met by increasing the suction force transmitted by upper stage 21 to the first substrate 51. However, the first substrate 51 may become damaged if the transmitted suction force becomes excessive. As display areas of LCD devices continues to increase, methods and apparatuses capable of safely and effectively transmitting suction forces from upper stages to corresponding substrates must be developed.

SUMMARY OF THE INVENTION

Accordingly, the present invention is directed to a structure for holding substrates to an upper stage of a substrate bonding apparatus used in fabricating LCD devices that substantially obviates one or more problems due to limitations and disadvantages of the related art.

An advantage of the present invention provides a structure for holding substrates to upper stages of substrate bonding apparatuses used in fabricating LCD devices, wherein the sagging phenomenon may be substantially eliminated.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a structure for holding substrates within a substrate bonding apparatus used in fabricating LCD devices may, for example, include upper and lower stages, wherein the upper and lower stages each include plurality of passages for holding substrates; suction force applying means for transmitting a suction force to a respective substrate to thereby hold a substrate to a respective stage, wherein the suction force applying means includes one end arranged within each passage, wherein the end is projectable outside each passage; and a vacuum pump for generating the suction force.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
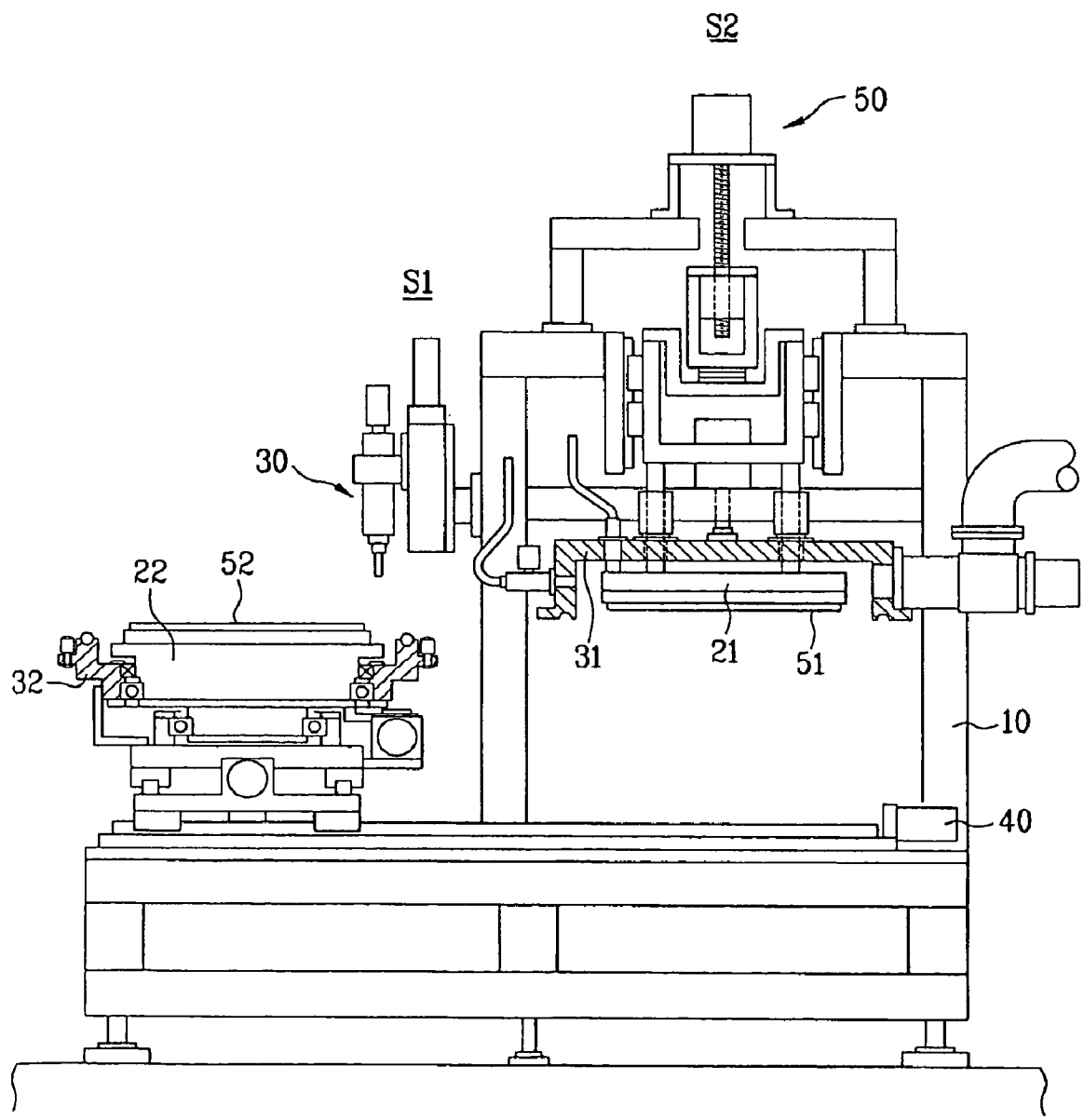
FIGS. 1 and 2 illustrate a related art substrate bonding apparatus used in fabricating LCD devices.
Figure 2:
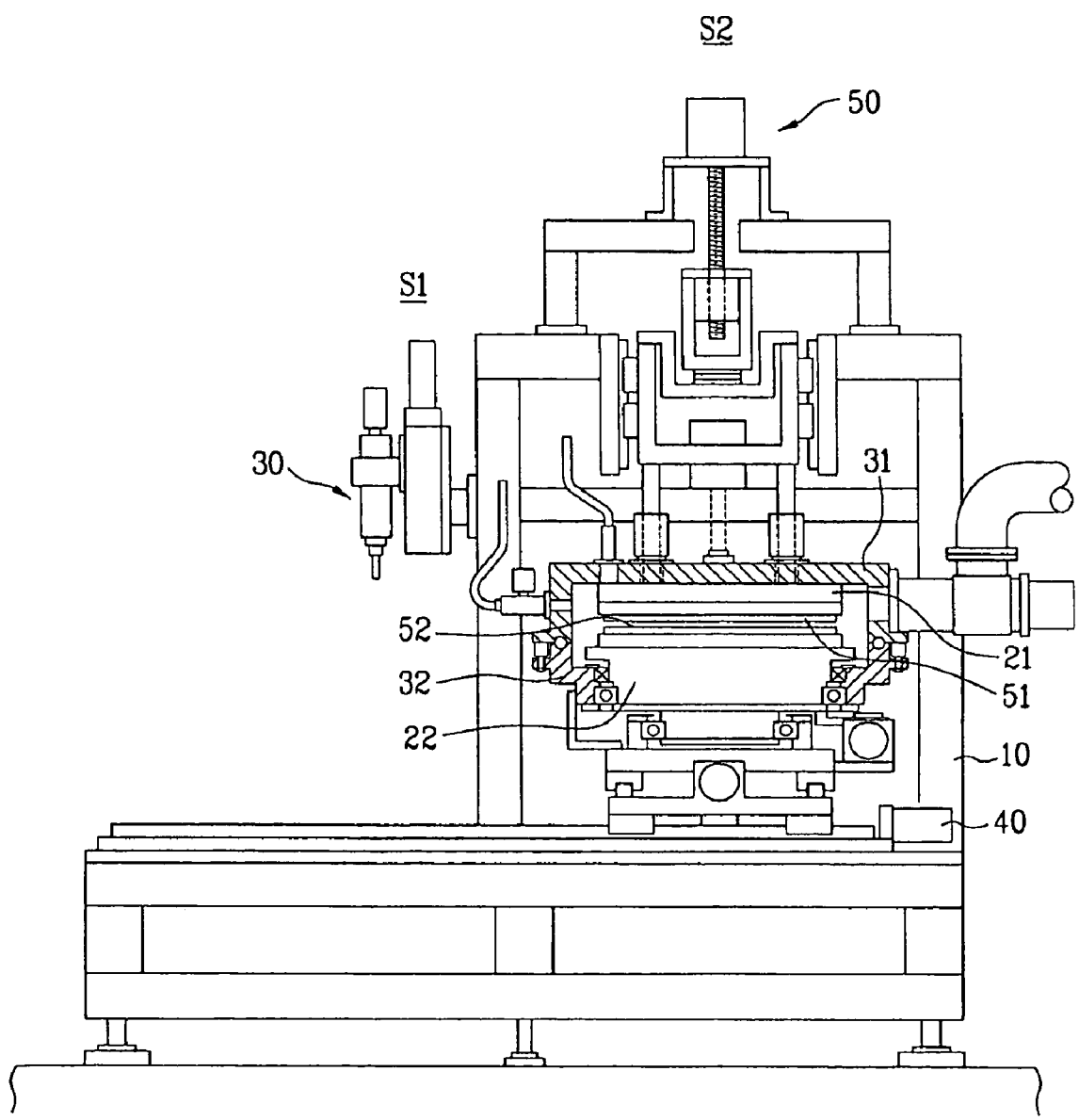
Figure 3:
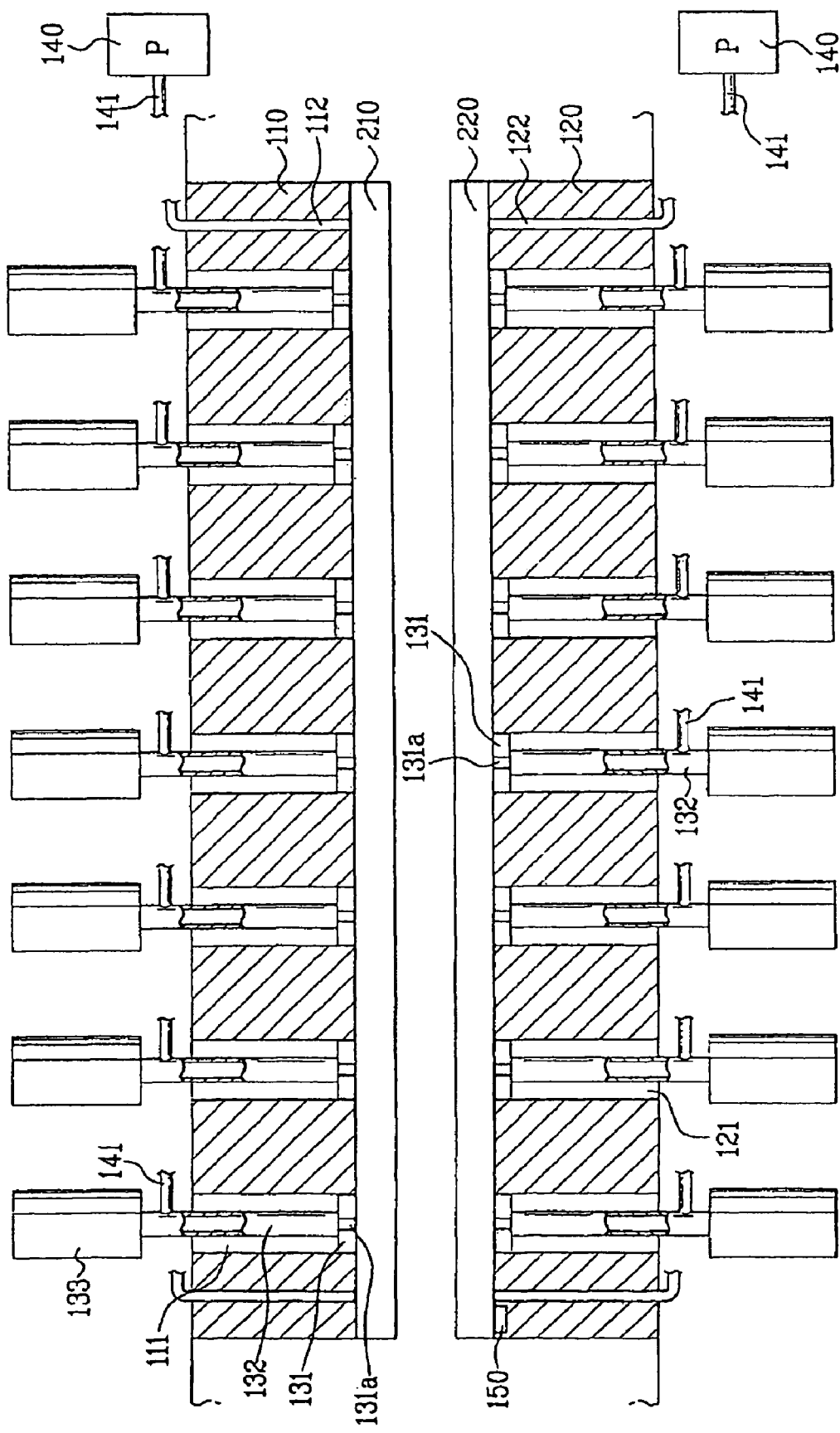
FIG. 3 illustrates a structure for holding substrates within a substrate bonding apparatus for fabricating LCD devices according to principles of the present invention.

FIG. 3 illustrates a structure for holding substrates within a substrate bonding apparatus used in fabricating LCD devices according to principles of the present invention.

Referring to FIG. 3, a structure for holding substrates within a substrate bonding apparatus used in fabricating LCD devices may, for example, include an upper stage 110, a lower stage 120, suction force applying means, a vacuum pump 140, and sensing means 150 for measuring a distance between a contact surface of the upper stage 110 and first substrate 210 and a contact surface of the lower stage 120 and the second substrate 220.

According to principles of the present invention, the upper and lower stages 110 and 120, respectively, may hold first and second substrates 210 and 220, respectively, by transmitting suction forces to operably proximate portions of substrates 210 and 220, respectively. In one aspect of the present invention, a plurality of passages 111 and 121 may be formed within stages 110 and 120, respectively, wherein each of the passages 111 and 121 intersect with the contact surfaces of the upper and lower stages 110 and 120, respectively. In one aspect of the present invention, the passages may be, for example, cylindrically shaped. In another aspect of the present invention, the suction force applying means may be arranged within each of the plurality of passages 111 and 121 and may hold substrates 210 and 220, respectively, to upper and lower stages 110 and 120, respectively, by transmitting a vacuum suction force to operably proximate portions of the substrates 210 and 220, respectively.

According to the principles of the present invention, the suction force applying means may, for example, include a plurality of pads 131, a plurality of moving pipes 132, and a plurality of driving parts 133. In one aspect of the present invention, each of the plurality of pads 131 may include at least one vacuum hole 131*a* for transmitting a suction force to the operably proximate portions of the substrates 210 and 220. In another aspect of the present invention, each of the plurality of moving pipes 132 may be in fluid communication with each vacuum hole 131*a* within a pad 131. In still another aspect of the present invention, each of the plurality of moving pipes 132 may raise or lower a respective pad 131 into and out of a respective one of the plurality of passages 111 and 121. Further, each of the plurality of moving pipes 132 may be in fluid communication with the vacuum pump 140, wherein the vacuum pump may generate the aforementioned suction force. In still another aspect of the present invention, each of the plurality of driving parts 133 may be connected to a respective one of the moving pipes 132 for independently raising or lowering each respective moving pipe 132 within its respective passage 111 or 121.

According to the principles of the present invention, cross-sectional dimensions of each pad 131 may substantially conform to cross-sectional dimensions of the respective passages 111 and 121. In one aspect of the present invention, however, cross-sectional dimensions of each pad 131 may be smaller than the cross-sectional dimensions of the respective passages 111 and 121. In one aspect of the present invention, each moving pipe 132 may include a first end and a second end, wherein the first end may be in fluid communication with each vacuum hole 131*a* within its respective pad 131, and wherein the second end may be arranged within each passage 111 and 121. Further, the second end may be in fluid communication with a connection pipe 141 of the vacuum pump 140. In yet another aspect of the present invention, the second end of each moving pipe 132 may be moved (e.g., raised and/or lowered) within a respective passage 111 or 121 by the driving part 133.

According to the principles of the present invention, the driving part 133 may, for example, be provided as an actuator wherein the moving pipe 132 is an axis. In one aspect of the present invention, the driving part 133 may, for example, be provided as a step motor or a linear motor, wherein the moving pipe 132 is the axis. It is appreciated, however, that the driving part 133 may be provided as substantially any mechanism suitable for moving the moving pipe 132. The vacuum pump 140 may generate a suction force by pumping. The generated suction force may be transmitted to each pad 131 via a respective moving pipe 132. The sensing means 150 may measure a distance between a contact surface of the upper stage 110 and first substrate 210 and a contact surface of the lower stage 120 and second substrate 220. In one aspect of the present invention, the sensing means 150 may be provided as an interval check sensor. Lastly, a plurality of vacuum holes 112 and 122 may be arranged within stages 110 and 120, respectively, for transmitting the generated suction force generated by the vacuum pump 140 from the contact surface of the upper and lower stages 110 and 120, respectively, to operably proximate portions of the substrates 210 and 220, respectively (e.g., peripheral edges).

Having described the inventive structure for holding substrates in a bonding apparatus used in fabricating LCD devices, the process by which substrates may be held within a bonding apparatus in accordance with the principles of the present invention will now be described in greater detail below.

Figure 4:
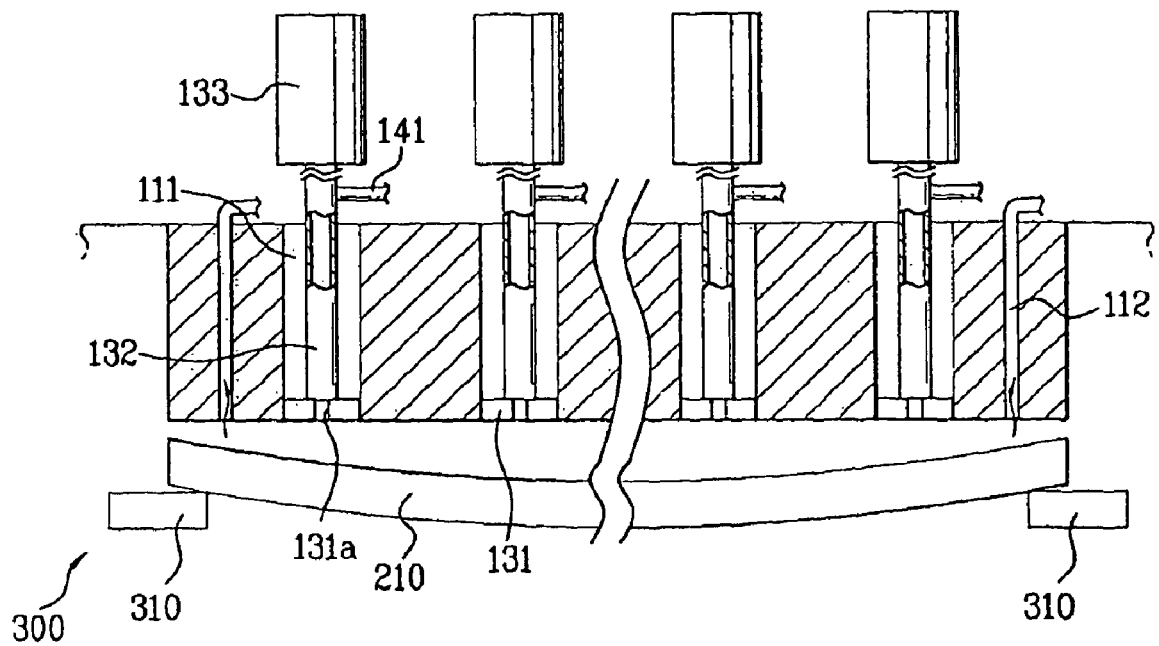
FIGS. 4 to 7 illustrate a method by which substrates may be held within a substrate bonding apparatus used in fabricating LCD devices according to principles of the present invention.
Figure 5:
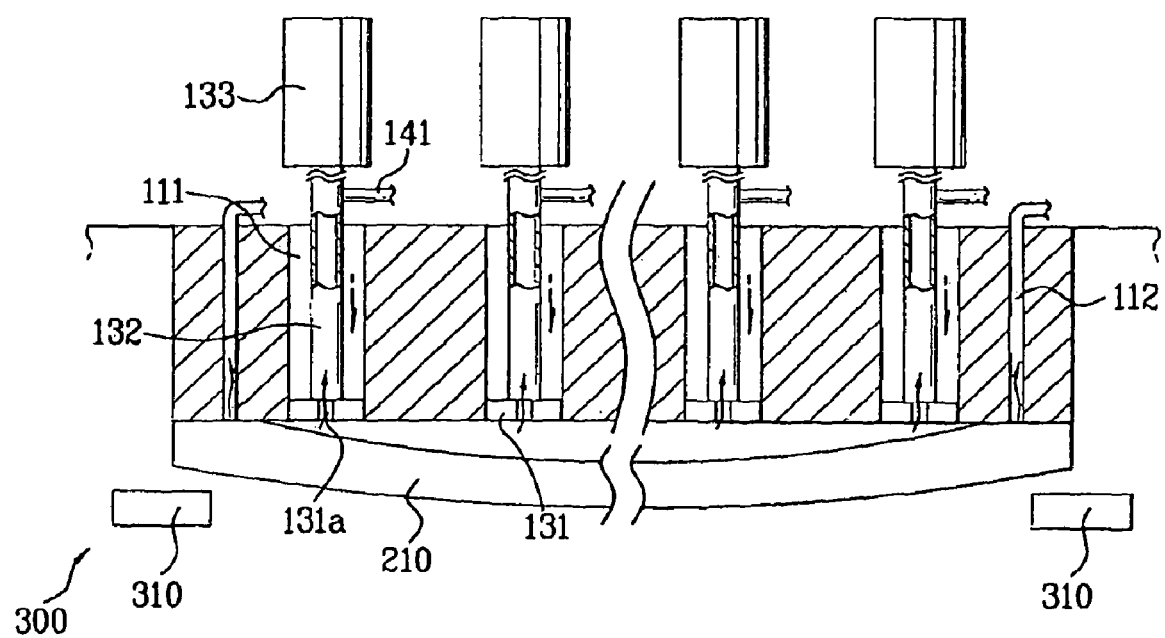

FIGS. 4 to 7 illustrate a method by which substrates are held within a substrate bonding apparatus used in fabricating LCD devices according to principles of the present invention Referring to FIG. 4, a loader 300 may be used to arrange a first substrate 210 proximate a contact surface of the upper stage 110. In one aspect of the present invention, sealant material may be arranged on a surface of the first substrate 210 opposite the contact surface of the first substrate 210. In another aspect of the present invention, the loader 300 may be provided with at least one finger 310 to minimize the degree to which portions of the first substrate 210 sag with respect to the contact surface of the upper stage 110. As shown in FIG. 4, however, portions of the first substrate 210 unsupported by fingers 310, may still sag with respect to the contact surface of the upper stage 210. After portions of the first substrate (e.g., peripheral portions) are arranged operably proximate the contact surface of the upper stage 110, the vacuum pump 140 may be activated to generate a suction force that is transmitted by the vacuum holes 112 formed in the upper stage 110. Accordingly, the vacuum holes 112 transmit the generated suction force from the contact surface of the upper stage 110 to hold the operably proximate portions of the first substrate 210 against the contact surface of the upper stage 110, as shown in FIG. 5.

Still referring to FIG. 5, portions of the first substrate 210 may not be operably proximate to the contact surface of the upper stage 110 (i.e., the first substrate 210 may sag with respect to the contact surface of the upper stage 110) and may therefore not be affected by the suction force transmitted by the vacuum holes 131a.

Figure 6:
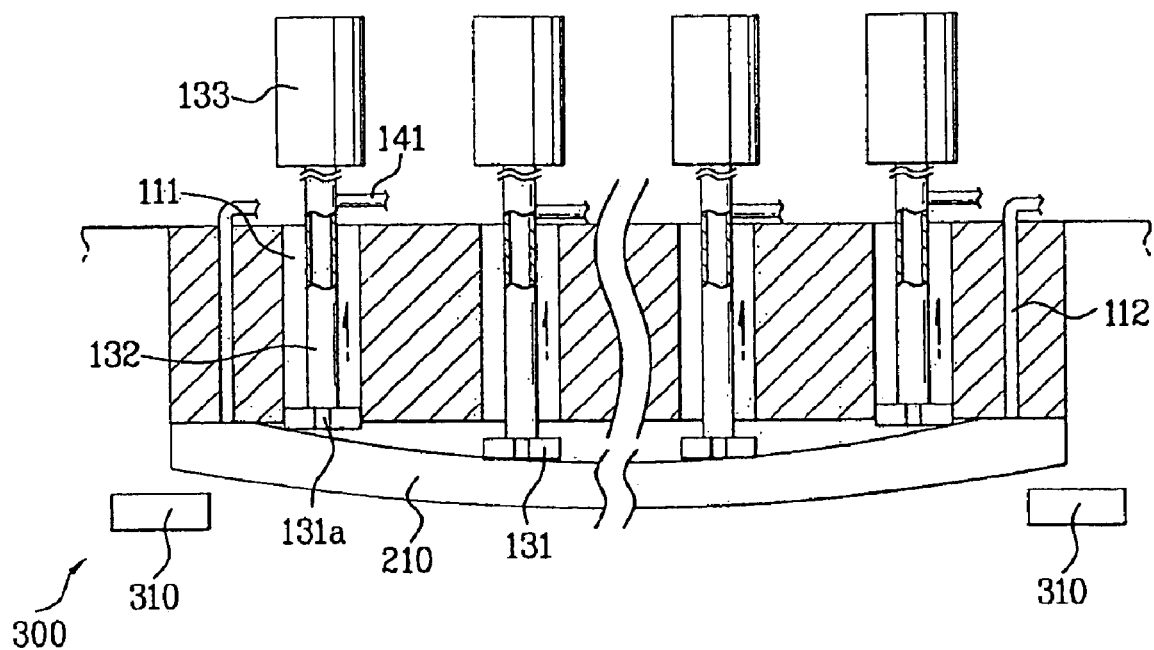

Referring to FIG. 6, due to the sagging of the first substrate 210, each driving part 133 may be independently driven to lower respective ones of the moving pipes 132 a predetermined distance from the contact surface of the upper stage 110. Upon lowering the moving pipes 132, respective ones of the vacuum holes 131a may be arranged operably proximate the sagging portions of first substrate 210. In one aspect of the present invention, each moving pipe 132 may be lowered a predetermined distance in accordance with an output of the sensing means 150. After each moving pipe 132 has been lowered the predetermined distance, the suction force, generated by the vacuum pump 140, may be effectively transmitted from the vacuum hole 131a of each pad 131 through each moving pipe 132 to the sagging portions of the first substrate 210. As a result, portions of the first substrate 210 previously found sagging with respect to the contact surface of the upper stage 210 may be held to the projected pads 131 by the transmitted suction force.

Figure 7:
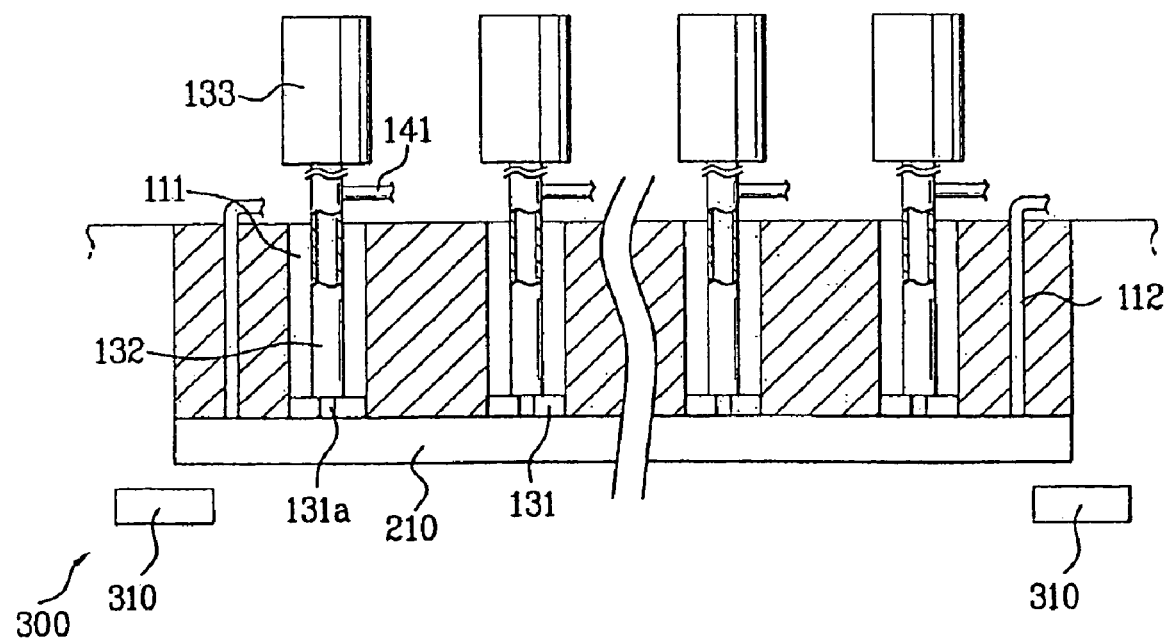

After the first substrate 210 is held to the pads 131, each driving part 133 may be independently driven again to raise respective ones of the moving pipes 132 by a predetermined distance. In one aspect of the present invention, the moving pipes 132 may be raised such that a lower surface of each of the pads 131 is substantially flush with the contact surface of the upper stage 110. In other words, the moving pipes 132 may be raised such that the first substrate 210 is held substantially parallel to the contact surface of the upper stage 110, as shown in FIG. 7.

After the first substrate 210 is held substantially parallel with the contact surface of the upper stage 110, the second substrate 220 may be held to a contact surface of the lower stage 120. In one aspect of the present invention, the second substrate 220 may be held by the lower stage 120 by, for example, providing the second substrate 220 on the loader 300, arranging the loader 300 between the upper and lower stages 110 and 120, respectively, and arranging the second substrate 220 proximate the contact surface of the lower stage 120. Next, the process for holding the proximately arranged second substrate 220 to the lower stage 120 may be performed by essentially the same method as described above for holding the first substrate 210 to the upper stage 110 and, therefore, a detailed description of such a holding process will be omitted. In another aspect of the present invention, however, the method by which the second substrate 220 is held to the lower stage 120 may be different from the process described above for holding the first substrate 210 to the upper stage 110. After being held to their respective stages 110 and 120, the first and second substrates 210 and 220, respectively, may be bonded together.

According to the principles of the present invention, the structure for holding substrates within a substrate bonding apparatus used in fabricating LCD devices is beneficial because substrates may be substantially prevented from sagging without transmitting excessively large, and damaging, suction forces. According to the principles of the present invention, suction forces may be effectively transmitted by the stage to operably proximate portions of a substrate. Upon holding a substrate to a stage, some portions of the substrate (e.g., peripheral portions) may be arranged operably proximate the stage while other portions of the substrate (e.g., interior portions) may not be arranged operably proximate the stage. Therefore, the substrate may appear to sag with respect to the contact surface of the stage. Accordingly, pads of the suction force applying means may be moved operably proximate potions of the substrate that are sagging to effectively transmit suction forces. Once suction forces have been effectively transmitted to the sagging portions of the substrate, the pads may be moved such that the substrate is held substantially parallel to the contact surface of the stage.

According to the principles of the present invention, excessive suction forces need not be applied while holding substrates to their respective stages. Therefore, the substrate may be prevented from sagging while applying a suction force that will not damage the substrate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A structure for holding a substrate within a substrate bonding apparatus, comprising:
   a stage having a contact surface;
   at least one passage arranged within the stage and intersecting the contact surface;
   a suction force applying means for transmitting a suction force a predetermined distance from the contact surface, wherein the suction force applying means is arranged within each passage, and wherein a portion of the suction force applying means is selectively projectable from within a respective passage to the predetermined distance from the contact surface; and
   a vacuum pump generating the suction force.

2. The structure of claim 1, wherein the suction force applying means includes:
   a pad having at least one vacuum hole transmitting the suction force to an operably proximate portion of a substrate;
   a moving pipe in fluid communication with the at least one vacuum hole and the vacuum pump, wherein the moving pipe is movable within the passage; and
   a driving part moving the moving pipe within the passage.

3. The structure of claim 2, wherein the at least one passage has first cross-sectional dimensions; the pad has second cross-sectional dimensions; and
   the second cross-sectional dimensions are smaller than the first cross-sectional dimensions.

4. The structure of claim 3, wherein the second cross-sectional dimensions are substantially conformal to the first cross-sectional dimensions.

5. The structure of claim 2, wherein the driving part comprises an actuator; and
   the moving pipe is an axis of the actuator.

6. The structure of claim 2, wherein the driving part comprises a step motor; and
   the moving pipe is an axis of the motor.

7. The structure of claim 1, further comprising sensing means for measuring a distance between the contact surface and a proximately arranged substrate.

8. The structure of claim 7, wherein the sensing means comprises an interval check sensor.

9. The structure of claim 1, further comprising a plurality of vacuum holes arranged within the stage and in fluid communication with the vacuum pump transmitting the generated suction force from the contact surface.

10. The structure of claim 1, wherein the stage comprises an upper stage.

11. The structure of claim 1, wherein the stage comprises a lower stage.

* * * * *